United States Patent [19]

Francis et al.

[11] Patent Number: 5,723,226
[45] Date of Patent: Mar. 3, 1998

[54] GYPSUM-CONTAINING COMPOSITIONS AND FIRE-RESISTANT ARTICLES

[75] Inventors: Hubert C. Francis, Lithonia; Anne H. Ksionzyk, Decatur, both of Ga.

[73] Assignee: G-P Gypsum Corporation, Atlanta, Ga.

[21] Appl. No.: 482,377

[22] Filed: Jun. 7, 1995

[51] Int. Cl.⁶ .................... B32B 29/00; C04B 14/00
[52] U.S. Cl. .................. 428/688; 428/921; 106/732; 106/773; 106/735; 106/772; 106/792
[58] Field of Search .................... 428/688, 921; 106/680, 695, 701, 721, 773, 735, 782, 791, 732

[56] References Cited

U.S. PATENT DOCUMENTS

| | | | |
|---|---|---|---|
| 2,076,349 | 4/1937 | Porter et al. | 106/34 |
| 4,174,230 | 11/1979 | Hashimoto et al. | 106/109 |
| 4,748,771 | 6/1988 | Lehnert et al. | 49/399 |
| 4,811,538 | 3/1989 | Lehnert et al. | 52/455 |
| 5,171,366 | 12/1992 | Richards et al. | 106/772 |
| 5,305,577 | 4/1994 | Richards et al. | 52/799 |

*Primary Examiner*—Helen Lee
*Attorney, Agent, or Firm*—Synnestvedt & Lechner

[57] ABSTRACT

A fire resistant article comprising at least about 65 wt. % gypsum dihydrate, reinforcing fibers disposed substantially homogeneously throughout said set gypsum dihydrate, inorganic binder, and optionally refractive filler. This composition provides superior resistance to damage when subjected to a stream of pressurized water as from a fire hose.

21 Claims, 6 Drawing Sheets

GYPSUM-CONTAINING COMPOSITIONS AND FIRE-RESISTANT ARTICLES

FIELD OF THE INVENTION

This invention relates generally to mineral-containing compositions for providing fire resistant, high strength, and hose stream resistant compositions, and to articles, structural members and constructions formed from such compositions.

BACKGROUND OF THE INVENTION

Fire-resistant articles, such as fire resistant boards and panels used in residential, commercial, and industrial applications, are frequently used to provide fire protection between different zones of a structure. For example, such products are commonly used to isolate high fire risk areas of a building from the remainder of the structure, such as the garage from the living quarters of a dwelling.

Such fire isolation structures generally include fire doors constructed from fire-resistant articles. In typical fire door constructions, a core, which may be solid or partially hollow, is contained between facings on the two major planar surfaces and is contained on the perimeters with edge banding. Fire resistant panels are commonly used as the door cores and fire resistant members are commonly used as edge banding.

Despite the fire resistant features incorporated therein, fire doors usually are not capable of indefinitely withstanding the high temperature conditions of a fire, but are instead designed to maintain the integrity of the fire wall for time sufficient to permit the occupants of a building to escape and to delay the spread of the fire. The doors are thus designed to retain their integrity under the severe conditions of a fire for a predefined period of time.

The door core and the edge banding must have good integrity during exposure to fire, that is, these articles must resist burning, melting, spalling, cracking, or deteriorating. During fire exposure, the core must also have good dimensional stability, that is, it must remain stable and resist warping or shrinking to the extent that it remains in contact with the edge banding (the stiles and the rails) around its perimeter. For obvious reasons, the edge banding preferably also possess these same fire resistant properties.

Various tests have been devised for determining the reliability of fire doors which are based, in part, on such factors as the time that a given door can withstand a certain temperature while maintaining its integrity. One such test is the ASTM E-152 fire test, which requires a door to maintain its integrity for periods ranging up to 1.5 hours while withstanding progressively higher temperatures within the range of 1750° F. to 1800° F.

Another characteristic of the fire resistant articles used in fire doors is the ability of the article to retain its integrity when exposed to a hose stream test of the type described in detail hereinafter (see comparative example 1). Edge banding typical of prior art fire resistant technology achieved hose stream test results of about 10–15 seconds. Such prior art edge banding is disclosed in U.S. Pat. No. 4,748,771 as comprising, on a weight basis: from about 65%–75% gypsum; 9.5%–11.5% organic resinous binder; 4%–5.5% of each of vermiculite and clay; and various fibers, including 0.8–1.3 paper fiber. Fiberboard products of the type having relatively low hose stream resistance values are disclosed in U.S. Pat. No. 5,171,366 as comprising, on a weight basis: from about 65%–95% gypsum; up to about 15% organic resinous binder; up to about 6% of each of vermiculite and clay; and various fibers, including 7%–30% paper fiber. Fire resistant articles with hose stream resistance substantially superior to prior art products would therefore be highly desirable from at least the fire safety point of view.

The cost of raw materials and the cost of fabrication are also considerations in fire door design. Furthermore, the weight of the door is important, both from the standpoint of ease in handling and the cost of transportation. The strength of the components used to construct the door is also a significant factor, since fire doors must pass the previously noted fire and hose stream tests, as well as have the requisite structural strength to withstand normal use and abuse. Finally, fire doors should exhibit screw holding capacity and split-resistance in localized areas where hinges, knobs, and locks are mounted.

Although commercial fire-resistant materials, such as those described in Hashimoto et al., U.S. Pat. No. 4,174,230, Vogt, U.S. Pat. No. 4,840,688, Porter et al., U.S. Pat. No. 2,076,349, and Lehnert et al., U.S. Pat. No. 4,748,771 (all of which are hereby incorporated by reference) are generally known to possess certain mechanical and fire-resistant properties which are acceptable in fire doors, they often require expensive, heavy, potentially hazardous additives, and relatively complicated constructions to achieve those properties. Thus, there is a need for a composition and structure which includes safe and inexpensive components from which superior fire doors and other structural panels can be made.

SUMMARY OF THE INVENTION

Applicants have discovered compositions that produce extraordinary and highly unexpected resistance to damage when subject to the hose stream test described in detail hereinafter. Two types of compositions are involved in the present invention. One type of composition is a fire resistant, hose stream resistant solid composition comprising set gypsum, reinforcing fibers, inorganic binder and optionally a refractory filler. For the purposes of convenience, but not necessarily by way of limitation, such solid, hose stream resistant compositions are sometimes referred to herein as fiberboard compositions.

Another aspect of the present invention is a composition for forming the solid, fire and hose stream resistant fiberboard compositions of the present invention. Such compositions are similar to the fiberboard compositions described above, except that they comprise settable gypsum, such as gypsum in anhydrous or hemihydrate form. As explained in detail hereinafter, such compositions are relatively flowable powders or slurries adaptable for use in molding or casting the fiberboard compositions of this invention. For the purpose of convenience, therefore, but not necessarily by way of limitation, such flowable compositions are sometimes referred to herein as molding compositions.

The fiberboard compositions of the present invention preferably comprise a substantially uniform distribution of solids including at least about 70 wt. % set gypsum, at least about 3 wt. % reinforcing fibers and from about 0.1 wt. % to about 25 wt. % of inorganic binder. Applicants have found that utilization of such components in the amounts as described herein provides fiberboard compositions with a truly extraordinary compliment of physical properties, including hose stream resistance of greater than about 20 seconds. The fiberboard compositions of the present inventions may also include other components, as described in more detail hereinafter.

The molding compositions of the present invention preferably comprise, on a water-free basis, at least about 60 wt.

% of settable gypsum at least about 3 wt. % of reinforcing fibers, and from about 0.1 wt. % to about 22 wt. % of inorganic binder. As explained in detail hereinafter, such molding compositions are capable of being readily converted to the fiberboard compositions of the present invention.

This invention also provides fire-resistant articles suitable for use in fire door applications. The preferred articles have at least a 20 minute ASTM E-152 fire test rating and a hose stream resistance of greater than about 20 seconds. Accordingly, practical and economical fire-resistant structures are provided which at once have excellent fire- and hose stream-resistance, as well as excellent screw holding capacity. The gypsum fiberboard articles of this invention are both safe and effective for use in structural elements subject to high temperatures. The articles can be produced relatively inexpensively and can be incorporated into fire doors, edge banding, fire walls, glass panel partitions and the like without excessive weight additions. As described in detail hereinafter, the gypsum fiberboard articles of the present invention can include scrap or waste materials, which can provide further cost incentives to manufacturers, as well as satisfy a current need for the recycling of building debris and flue slag.

The fiberboard articles of this invention preferably do not include paper facing sheets, such as those normally employed with ordinary paper-surfaced gypsum wallboard. In wallboard composites, the paper facings of two or more wallboards are usually adhesively bonded together for laminating the different components together. Paper facing, however, is very susceptible to humidity changes in the atmosphere, which can adversely affect the laminated components. Additionally, during a fire, water driven off from the chemically combined gypsum, weakens the paper, causing delamination and premature failure. Paper facing is also known to char away, leaving little, if any, adhesive bonds between the layers of a composite member.

Since the fiberboards of this invention preferably do not have paper facing sheets, they are more stable throughout a wide range of changing humidities, making them attractive in even the most damp applications. Moreover, the intimate contact between the paper fibers and set gypsum in the fiberboard composition of this invention can withstand a far higher temperature before evidencing deterioration of the adhesive bonds between the gypsum fiberboard layers than is the case for delamination of adhesively secured wallboards.

A further advantage of this invention is the simplification and structural improvement of the disclosed edge banding versus tripartite and other laminated systems of the prior art. The gypsum fiberboard articles of this invention are adaptable for use as edge banding with superior split and hose stream resistance. The present fiberboard articles can also be readily machined for providing relief designs, such as those found in panel doors.

BRIEF DESCRIPTION OF THE DRAWINGS

The accompanying drawings illustrate preferred embodiments of the invention as well as other information pertinent to the disclosure, and in which.

DETAILED DESCRIPTION OF THE INVENTION

I. THE COMPOSITIONS

Fiberboard compositions in accordance with the present invention comprise set gypsum, reinforcing fibers, inorganic binder and, optionally, refractory filler, all of which are generally solid components. Other components may also be included in the present articles, as disclosed in detail hereinafter. The molding compositions of the present invention are utilized to form the present fiberboard compositions but incorporate settable gypsum in place of set gypsum. In general, the compositions of this invention comprise a substantially uniform distribution of solids.

According to preferred embodiments of the present invention, the fiberboard compositions comprise gypsum, reinforcing fibers, inorganic binder and optionally refractory filler in amounts such that said fiberboard composition has a hose stream endurance value of at least about 20 seconds, more preferably at least about 30 seconds and even more preferably at least about 50 seconds.

A. The Gypsum Component

One of the essential constituents of fiberboard compositions and molding compositions of the present invention is calcium sulfate in one or more or its forms. More particularly, calcium sulfate dihydrate, which is preferred for use in the fiberboard compositions of the present invention, is derived from hydration of any form of calcium sulfate capable of reacting with water to form set gypsum, that is calcium sulfate dihydrate. Thus, the calcium sulfate used in the molding compositions of the present invention can be in anhydrous form ($CaSO_4$), in the hemihydrate form ($CaSO_4 \cdot \frac{1}{2} H_2O$), or in the form of mixtures of these. It is contemplated, however, the hemihydrate form of calcium sulfate will be most widely used.

As is known to those skilled in the art, calcium sulfate hemihydrate is generally available in either an "alpha" crystalline form or a "beta" crystalline form. In general, it is contemplated that either alpha or beta forms of the hemihydrate (sometimes referred to herein as alpha- and beta-gypsum, respectively) may be used and further that various combinations of alpha and beta hemihydrate are adaptable for use in accordance with the present invention. The hemihydrate gypsum preferred for use in the molding compositions may be derived from any one of several well known sources, including by heating, or calcining, naturally-occurring gypsum dihydrate.

As mentioned above, one of the advantages of the present invention is that waste-type materials can be used for certain components of the present compositions. For example, there can be used as the source of the calcium sulfate the material known as "desulfurized by-product gypsum" which is produced by the desulfurization of flue gas. This invention can employ any of the above-disclosed individual sources of calcium sulfate, but a mixture of the different sources of calcium sulfate can also be used.

Another example of a waste- or scrap-type material that can be used in the practice of the present invention is scrap gypsum wallboard, which can be used as a source of both calcium sulfate and the paper constituent of the fiberboard. For this purpose, scrap paper-faced gypsum wallboard can be ground into suitably small particles which are processed in water under pressure and in the presence of a crystal modifier to form non-fibrous calcium sulfate hemihydrate. Scrap gypsum wallboard can also be transformed into a suitable material for use in the practice of the present invention by grinding and calcining it at atmospheric pressure. Sufficient water can be used to form the desired pulp-type material from which the product is conveniently made.

It is contemplated that the molding compositions of the present invention will be most frequently, although not exclusively, used in the form of a dispersion, slurry or suspension of the solid components thereof in an aqueous medium. The present molding compositions preferably comprise settable calcium sulfate in amounts, based on the total solids content, of from about 60 wt. % to about 83 wt. %, and more preferably from about 72 wt. % and about 77 wt. %, depending upon the specific application intended for the resultant fiberboard article. For example, in a fiberboard to be employed as either edge banding or door core, the settable calcium sulfate content of the molding composition is preferably in the range of from about 73% to about 77% by weight of the solids.

The preferred molding compositions for preparing the fiberboard compositions of this invention will also include water in an amount in excess of that required to react with and hydrate the settable gypsum. That is, at least about 20-fold excess, and preferably greater than about 10-fold excess amount of water should be present. Applicants' preferred ranges of water and pulped paper fiber promote homogeneity of the fiber and gypsum components and subsequently result in higher flexural strength and screw-holding capacity measurements.

The gypsum dihydrate content of the fiberboard compositions of this invention will be approximately 18.5% greater than the settable gypsum content of the molding compositions from which they are made, the difference representing the added water of hydration in the set gypsum dihydrate. That is, by weight, the set gypsum will preferably comprise from about 65% to about 90%, more preferably from about 70% to about 85% of the overall set composition. In a fiberboard for use as edge banding or a core in a fire door, the set gypsum dihydrate most preferably comprises from about 77% to about 82% by weight of the fiberboard composition.

B. Inorganic Binder

An important component of the compositions of the present invention is inorganic binder. As used herein, the term "inorganic binder" is used to refer to any inorganic-based component or combination of components which serve to improve the strength and structural integrity of the composition, and is intended to include not only the inorganic binder per se but also precursors for the inorganic binder. In addition, the term "inorganic binder" as used herein is not intended to include the gypsum component of the present compositions and articles.

Applicants have discovered that the amount and type of inorganic binder used in accordance with the present invention is critically important to achieving many of the beneficial results described herein. For example, applicants have discovered that inorganic binders comprising, and preferably consisting essentially of, refractory inorganic binders are highly preferred from at least a performance perspective. As used herein, the term "refractory inorganic binder" is used to refer to materials which perform the dual function of: (1) enhancing the refractory characteristics of the fiberboard composition; and (2) enhancing, through binding action, the high temperature structural integrity of the fiberboard compositions.

Thus, although it is contemplated that numerous and varied inorganic binders may be used to advantage within the scope of the present invention, preferred inorganic binders are lime-based cements, such as Portland cements, because such cements are refractory inorganic binders in accordance with the present invention. Especially preferred are Types II through V Portland cements, with Type III being most preferred. Portland cement is a highly preferred refractory binding agent in accordance with the present invention because it not only has an inherent binding capacity, but it also is substantially refractory, hence improving the high temperature structural integrity of the fiberboard compositions of the present invention.

The inorganic binder of the present invention is preferably present in the compositions in an amount of from about 0.1 wt. % to about 25 wt. % by weight based on total solids content. When the preferred refractory inorganic binder is utilized, the compositions preferably comprise from about 5 wt. % to about 20 wt. % of such refractory binder, based on the total weight of solids.

The inorganic binder of the present invention also preferably comprises small amounts, preferably up to about 1 wt. % on the basis of the total composition, of free lime. As the term used herein, "free lime" refers to lime which is in the composition independent of any lime which may be present as a component of other lime-containing inorganic binders in the composition. For example, Portland cement itself may contain or be associated with small amounts of lime, and the term "free lime" is used herein to exclude such amounts.

The preferred free lime of the present invention not only enhances the binding activity of many inorganic binders, including Portland cements, but it also can be advantageously used to adjust the pH of the composition. More particularly, many materials used as binding agents, including Portland Cement, exhibit superior performance in the presence of increased pH. Accordingly, the use of free lime can beneficially serve this function. More specifically, it is preferred that the pH of the present composition is at least about 9, more preferably greater than about 10, and even more preferably from about 10 to about 12. The particular amount of free lime, or any other pH adjusting agent, used in any particular application will depend upon many factors, and it is contemplated that adjustment of lime concentration is within the skill of the art in view of the teachings provided herein.

In certain embodiments, the amount of inorganic binder can be as little as about 0.1 wt % of the total solids. In embodiments comprising from about 0.1 wt. % to about 1 wt. % inorganic binder, it is preferred that the compositions comprise, on the basis of total solids, at least about 5 wt. % of refractory filler, and even more preferably from about 15 wt. % refractory filler. In such embodiments it is also preferred that the inorganic binder comprise free lime.

In addition to Portland cement and free lime, it is contemplated that the following inorganic binders may also be utilized, either alone or in combination with other inorganic binders: sodium and calcium silicates; and high lime flyash, such as Class C flyash.

C. Reinforcing Fibers

The reinforcing fiber component of the present compositions is important for achieving the strength and other desirable characteristics of the fiberboard articles in accordance with the present invention. Although it is contemplated that numerous fibrous materials may be used in accordance with the teachings contained herein, it is generally preferred that the present compositions comprise cellulosic fiber, and even more preferably paper fiber. Cellulosic fiber includes the fibrous component of plants, such as cotton, linen, and flax, for example. Among the various sources of cellulosic fiber, paper stock is conveniently and preferably employed.

The present compositions preferably include, based on the total weight of solid components, from about 3% to about 30% of reinforcing fiber, more preferably from about 5% to about 24% of reinforcing fiber, and even more preferably from about 5% to about 15%. Applicants have determined that paper fiber concentrations greater than about 24 wt. % are generally not preferred. It has further been noted that when the concentration of paper falls significantly below about 3%, screw-holding capacity is diminished, necessitating complicated composites for achieving sufficient screw-holding ability for use as edge banding in door applications. See Lehnert et al., U.S. Pat. No. 4,748,771, which discloses a wood-polymer-gypsum fiberboard composite for achieving 500 lbs screw-holding capacity, wherein the fiberboard includes paper fibers up to about 1.3 wt. %.

Building materials intended for use in various specific products may contain somewhat different amounts of paper fiber. For example, a fiberboard intended for use as edge banding or door core preferably contains about 7% paper fiber by weight. The presence of the paper fiber makes it possible to produce building materials having good physical characteristics such as flexural strength, screw and nail holding ability, and surface hardness without having any separate surfacing membrane such as the paper facing on conventional gypsum wallboard.

The paper fiber can be derived from either virgin paper stock, or previously used, waste paper stock can be employed. The source of the paper can be wood, cotton or linen rags, straw, etc., the origin or history of the paper not being important factors. The paper may be a product of the sulfite process, the sulfate (Kraft paper) process, or other processes. Among the types of paper stock that have been successfully employed are virgin and brown Kraft papers, and especially, newsprint. Waste newspaper provides very satisfactory results, is inexpensive, and its use helps to overcome an environmental pollution problem. And, as mentioned hereinabove, the source of the paper stock can include the paper of ground paper-faced gypsum wallboard.

In certain embodiments, the reinforcing fibers of the present invention comprise inorganic fiber. As used herein, the term "inorganic fiber" is intended to include glass textile fiber and mineral wool. These latter terms are defined in U.S. Pat. No. 4,557,973, and those definitions are incorporated herein by reference. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." As employed in this invention, the glass textile fiber generally will be chopped, e.g., the fibers may be about ½ inch long.

Certain fiberboards of this invention preferably include siliceous fiber. Siliceous fiber improves the fire resistance of the building materials and other products of this invention, apparently by decreasing the tendency of the gypsum construction to crack under thermal stress. The siliceous fiber preferably comprises up to about 7% by weight and may include glass textile fiber and, in addition, glass wool, depending upon the specific product. For example, a building board intended for use as edge banding in a fire door preferably includes up to about 7% by weight glass textile fiber, most preferably about 2% by weight glass textile fiber, glass wool being unnecessary. However, a building panel intended to be used as facing on a fire door preferably includes about 0.8% to about 2% siliceous fiber, most preferably a combination of about 0.4% chopped glass textile fiber and about 0.5% to about 1.5% glass wool by weight.

D. Filler

The compositions of the present invention optionally, but preferably, include filler, and preferably refractory filler, in an amount of from about 2 wt. % to about 15 wt. % of the composition, based on total solids. The use of fillers in accordance with the present invention not only reduces the cost and thereby enhances the desirability of the present compositions, but it also can enhance the strength and integrity of the fiberboard compositions. In addition, refractory fillers, such as silicates of aluminum and diatomaceous earth, have a beneficial impact on the fire resistance and density of the present compositions. More specifically, the refractory fillers of the present invention are highly resistant to degredation during long term exposure to heat and high temperatures.

Pozzolanic materials (such as volcanic silicates of aluminum, including perlite) are preferred for use as refractory fillers in embodiments in which the inorganic binder consists essentially of free lime present in amounts of less than about 1 wt. %. Diatamaceous earth (such a celite) are preferred for use as refractory fillers in embodiments in which the inorganic binder comprises greater than about 5 wt. % of refractory inorganic binder.

Other binders that may be used in accordance with the present invention include calcium carbonates, Kaolin clay, low lime fly ash (such as Class F flyash) and sericite.

For embodiments in which the inorganic binder comprises from about 5 wt. % to about 20 wt. % of refractory inorganic binder, the preferred refractory filler is diatomaceous earth in amounts of less than about 5 wt. % on the basis of total solids. Applicants have found that the presence of greater than about 5% filler can be detrimental and undesirable in such embodiments. More specifically, the presence of filler in amounts in excess of about 5% by weight in such embodiments creates processing difficulties in that it adversely affects the dewatering process preferably utilized to convert the molding compositions into a fiberboard composition, (described in more detail hereinafter).

E. Other Components

The present composition may also contain other components referred to herein as performance boosters. When present, such performance boosters are preferably present in amounts, based on the total weight of solid components in the composition, of from about 1.5% to about 35%. Such performance boosting additives will vary depending to some extent on the intended utility of the final product. In many cases, there will be desirably used one or more defoaming agents, dispersants, and accelerators, ingredients which are well known in the art and are employed at low concentration levels, generally each at less than about 1% by weight of the solids.

The performance booster may also include either clay or vermiculite, or both, especially if the intended board or panel requires excellent fire resistance. Both of these materials may be present in amounts up to about 15.0% by weight, preferably up to about 6%, and more preferably about 3% to about 4% by weight of the solids. The clay to be employed will generally be kaolin clay, which is effective to control the shrinkage of the gypsum-containing construction under extreme heat, for example, ASP 70 Kaolin clay sold by Minerals and Chemicals Philip Corporation. The vermiculite should be raw, or unexpanded vermiculite, which swells when heated, helping to control shrinkage of the construction and possible cracking. The requirement for the presence of these materials depends somewhat on the intended use for the final product and may not be necessary in, e.g., a panel intended for use as facings in a fire door.

The composition of the preferred fiberboards of this invention, as well as the construction techniques for adhesively bonding the fiberboards together to form various structures, may also employ binder polymer. The binder polymer affects the physical properties of the fiberboard layers, especially their flexural strength, and also permits good fastener retention at lower density. Furthermore, the binder polymer improves the surface characteristics of the board, panel, door, or insulating member such as smoothing the surface and making it easier to finish.

The binder polymer, when present, may comprise up to about 15% by weight of the solids, but preferably about 1% to about 3% by weight. A number of different polymeric materials may be employed as binder polymer, including homopolymers, such as poly(vinyl acetate) and polyacrylate, as well as copolymers, such as poly(ethylene) -co-(vinyl chloride), poly(styrene)-co-(butadiene), and poly(vinyl acetate)-co-(methyl acrylate). Among the various binder polymer possibilities, esters of poly(vinyl alcohol) are especially effective, and poly(vinyl acetate) homopolymer is preferred. It is also convenient in most cases to introduce the binder polymer as an aqueous emulsion, many of which are commercially available.

In selecting the binder polymer, thermoplastic resins are preferred since they tend to form a tough, forgiving film, rather than a brittle film, or one which is soft and has a very low tensile strength when applied for joining the surfaces of the fiberboards, stiles, and rails. Thermoplastic resins are also preferred since the heat required to set a thermosetting resin tends to calcine the gypsum in the preferred fiberboard compositions of this invention. Materials suitable for use as the resin polymer of the preferred fiberboard composition and as an adhesive for bonding the various fire door and fire panel elements to one another are poly-(vinyl acetate) emulsions and acrylic polymers.

F. Component Concentrations

Applicants have found that the utilization of the above identified components in the concentrations described herein produce fiberboard compositions having superior and altogether unexpected resistance to degradation when exposed to the hose stream test while retaining outstanding performance in other important categories, such as fire resistance, flexural strength and screw holding capacity.

With respect to the gypsum concentrations of the present invention, applicants have found that the use of gypsum in amounts below those describe herein produces an unacceptable degradation in the fire resistant properties of the fiberboard compositions. For example, the use of at least about 75% by weight of set gypsum in the fiberboard compositions is required in order to ensure adequate fire resistance in such compositions. On the other hand, applicants have discovered that the use of gypsum in amounts greater than the preferred upper limits described herein produces difficulties, such as excessively high densities and poor hose stream capacity.

With respect to the inorganic binder of the present invention, applicants have found that the use of less than about 0.1% by weight of inorganic binder has a significant detrimental impact upon the ability of the fiberboard compositions to resist degradation when exposed to the hose stream test. On the other hand, applicants have discovered that the use of greater than about 25% by weight of inorganic binder has a negative impact on the fiberboard compositions in that the ability of the board to resist and retard heat and fire transfer is greatly diminished.

II. THE METHODS

Figure 1:
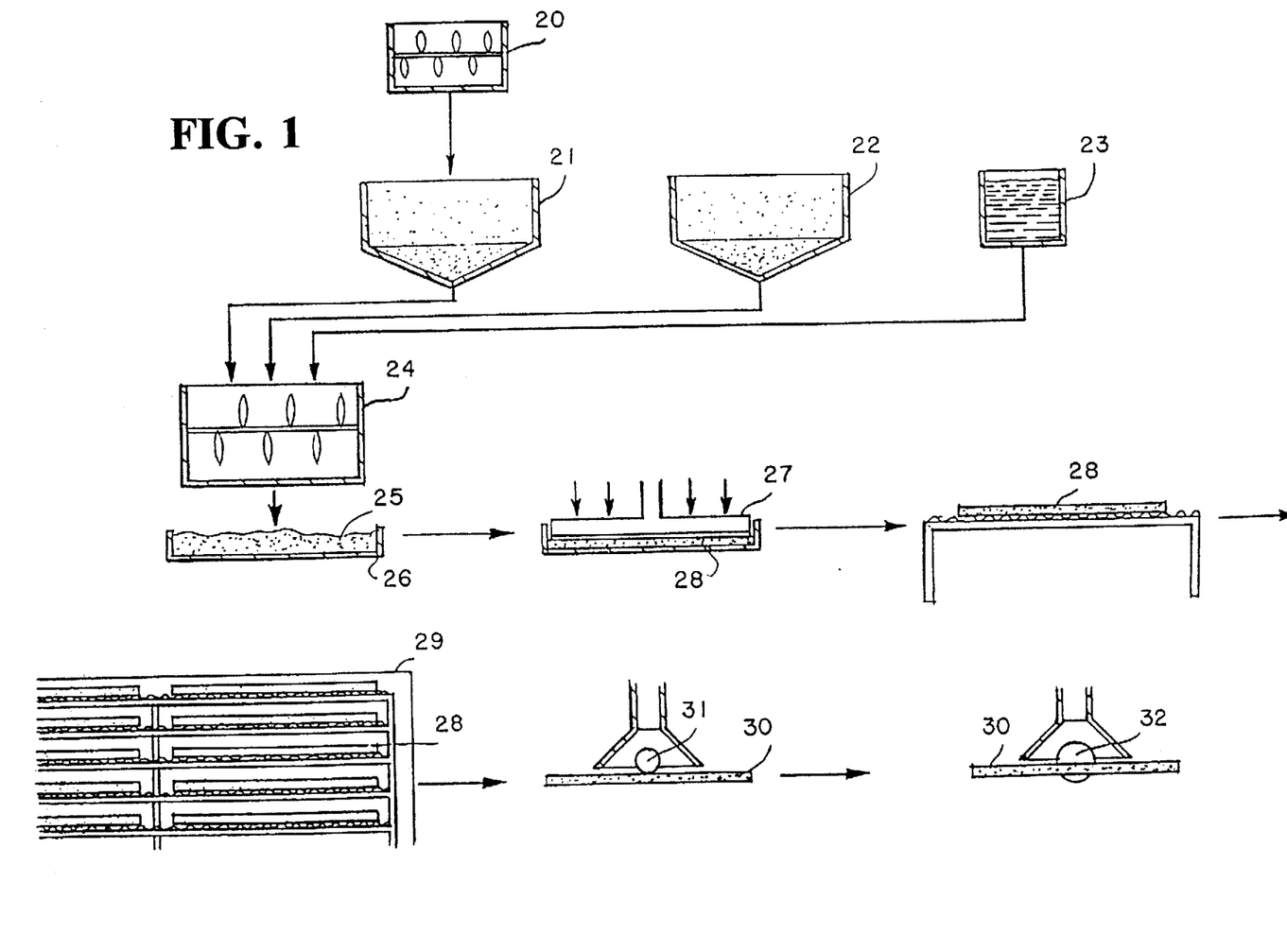
FIG. 1: is a flow diagram which illustrates the process of this invention by which gypsum-containing fiberboards are made.

Although the fiberboard compositions of this invention may be formulated in a variety of ways, and any number of different techniques may be employed to produce the panels and boards of this invention, a process which is preferred for making these structures is illustrated diagrammatically in FIG. 1. With reference to FIG. 1, the paper fiber component, e.g., newspaper, together with water, at least about 20 times as much water by weight as paper, are added to pulper 20, and the mixture is reduced to pulp, producing a substantially homogeneous suspension. Glass wool, if it is specified in the composition, can be separately pulped in at least about 20 times its weight of water and the separately pulped wool and paper combined. Alternatively, the paper and glass wool can be pulped together, if desired, in at least about 20 times their combined weight of water. Any textile glass fiber, clay and vermiculite called for are then added to the pulper and thoroughly mixed and incorporated into the suspension. The suspension is then transferred to tank 21.

As needed and required for the composition, pulped suspension from tank 21 is added to mixer 24, any binder polymer from tank 22 as may be required for the composition is added to mixer 24, and sufficient non-fibrous calcium sulfate to yield the requisite amount of dihydrate when reacted with less than about 5% of the water is added from tank 23 to mixer 24, wherein all the components are mixed and incorporated into the suspension, producing a slurry.

The wet slurry 25, sometimes referred to herein as "gypsum stucco", is then cast into mold 26, and the slurry is pressed under hydraulic press 27 for dewatering the slurry and for producing a green casting 28. It will be appreciated that the mold 26 can be adapted to form the gypsum slurry 25 into the final shape and dimension of the member to be produced. For example, if an elongate member to be used has a stud or edge banding is desired, a mold having the appropriate dimension to produce the finished product can be employed. Alternatively and preferably, the mold can be in the form of a more conventional sheet having the appropriate thickness, which after setting and drying is cut to the desired width and/or length.

The inorganic binder and filler components of the present invention can be added to either the pulper 20, the mixer 24, or other locations as appropriate.

The pressure employed in the hydraulic press 27 determines the density of the final product; densities in the range of about 40 lbs/ft$^3$ to about 75 lbs/ft$^3$ being readily attained. For the fire-resistant applications of this invention, a density of at least about 60 lbs/ft$^3$, preferably above about 65 lbs/ft$^3$ is preferred.

The green casting is allowed to set and is then conveyed into oven 29 and the set casting is dried. If desired, dried set casting 30 may be sanded at sanding station 31 to the desired thickness and/or then cut to the desired size with saw 32. It will be evident that the aforesaid steps can be adapted to either a batch or continuous process.

In the preferred continuous process for manufacturing boards and panels within the scope of the present invention, the aforementioned aqueous dispersion of constituents is formed into a sheet of indefinite length by the use of standard paper-making techniques. For example, the aqueous dispersion of constituents can be fed from a head box of the type associated with a paper-making machine to a foraminous moving belt through which water drains as the mass of solids coagulates and sets. The resulting composite sheet is consolidated by passing through press rolls. Heated rollers can also be used to dry the sheet.

The processes of the present invention can be used to make an unsupported (unfaced) fiberboard which has a substantially uniform and homogeneous composition throughout its thickness. The term "unfaced" is used herein to mean that the fiberboard is preferably not faced with a sheet material, for example, the paper or glass fiber mat that is often used as a facing material for gypsum wallboard.

As mentioned above, it is preferred that the fiberboard layers of the present invention have a density of at least about 60 lbs/ft$^3$, but it will be understood that the material can have a density of as low as 40 lbs/ft$^3$ for some applications. In order to achieve flexural strength and screw-holding capacity having the values referred to above (30 lbs and 400 lbs respectively) in building materials having densities below 60 lbs/ft$^3$, there should be included in the composition from which the building material is made relatively high amounts of binder polymer, for example, about 25 wt. % to about 35 wt. % based on solids content. For applications in which such flexural strength characteristics and screw-holding capacity are not considered important, the use of such binder polymer can be absent or provided in smaller amounts. The density of the fiberboard can be controlled by the use of pressure in forming the product and/or by the use of a low-density material, for example, expanded perlite.

In contrast to that which has been taught previously in the gypsum arts, such as in U.S. Pat. No. 4,557,973, it is not necessary in the process described above to pretreat the glass wool with powdered gypsum prior to its use. Furthermore, the presence of the vast excess amount of water permits the gypsum slurry to flow out in the mold to a uniform thickness.

In pressing the slurry to produce the green casting, care is required in order to prevent geysering, in which streams of slurry suddenly exit the mold with a great deal of force. This can be avoided by applying pressure slowly to the slurry.

As will be appreciated by those skilled in the art, the cost of producing fire resistant fiberboard in accordance with the present invention increases as the care and time required to manufacture the board increases. Thus, an incentive exists to minimize the processing difficulties associated with producing a fiberboard with the minimum densities specified herein, while maintaining the superior physical properties described above. Applicants have surprisingly discovered that processing and cost advantages can be achieved, without a significant deterioration in board performance properties, when the gypsum dihydrate which forms the member is formed from a combination of alpha gypsum and beta gypsum, preferably a combination having an alpha:beta gypsum weight ratio of from about 60:40 to about 75:25, and even more preferably of about 70:30. Alpha gypsum consists of relatively regular, blocky crystals having a relatively low crystallization temperature (approximately about 23°–32° F.), whereas beta gypsum consists of relatively irregular, somewhat elongated crystals having a relatively higher crystallization temperature (approximately 40°–60° C.). Applicants have discovered that the use of an alpha:beta gypsum combination as described herein allows the production of a fiberboard with exceptional physical properties while minimizing processing difficulties, such as geysering. Although applicants do not necessarily wish to be bound by any particular theory of operation, it is believed that the crystalline structure of beta gypsum tends to absorb relatively large quantities of water, which increases the difficulty of removing water during the pressing operation. The lower water absorption associated with alpha gypsum on the other hand, tends to lessen these processing difficulties.

III. FIRE RESISTANT AND HOSE STREAM RESISTANT FIBERBOARD AND PRODUCTS MADE THEREFROM

One important aspect of the present invention is the use of the compositions hereof to form fire resistant and hose stream resistant articles which can be used with great advantage in numerous applications. According to preferred embodiments, the articles of the present invention are preferably in the form of structural members adaptable for use in the following applications: door components, such as door cores, stiles, rails, and a door framing members; glass panel framing members; and similar structures.

The present articles are preferably in the form of a gypsum fiberboard. As used herein, the term "fiberboard" refers to gypsum-based articles of various and unrestricted dimension in which the integrity and strength of the article is derived from the components of the composition from which the article is formed. Thus, the present articles exhibit excellent physical characteristics such as flexural strength, screw and nail holding ability, surface hardness, and hose stream resistance without the need of a separate surfacing membrane such as the paper facing on conventional gypsum wallboard. Of course, the use of membrane may nevertheless be desirable in certain circumstances, and the use of such a membrane is contemplated to be within the scope of the present invention.

A. FIBERBOARD EXAMPLES

Comparative Fiberboard Example 1

A fiberboard composition made substantially according to the prior art as disclosed in U.S. Pat. No. 5,171,366 was prepared containing the following ingredients in parts by weight:

| Ingredient | PBW |
| --- | --- |
| gypsum hemihydrate | 90 |
| paper fibers | 7 |
| vermiculite | 1 |
| polymer binder | 0.7 |
| glass fiber | 1.5 |

The fiberboard was tested for hose stream resistance in accordance with the following procedure. A sample of the fiberboard having the dimension of 2"×2−×1½" (l×w×h) was provided. The sample was placed in a muffle furnace maintained at a constant temperature of about 1000° F. for one-half hour. The sample was then immediately transferred to a platform in the front of a soft, fire-brick having dimensions of about 9"×4½"×2" with cutouts to accept the sample. The platform containing the sample was located below a goose-neck faucet with tubing adapter for supplying water at 48 psi. The distance between the tip of the faucet (tubing adaptor) and the area where the sample was placed on the platform was 21". The platform was centered directly below the faucet. The platform had a hole located below the faucet area as a means for water to flow and for observation of penetration of the sample by the water stream. A plexi-glass shield having a hole therein was positioned with the hole directly below the faucet and above the sample and platform. This shield prevented water from splashing into the work area but still permitted viewing of the sample being tested. The water stream from the faucet was initiated and the amount of time for the water stream to penetrate through the sample was found to be about 15–20 seconds.

Fiberboard Example 1

A fiberboard composition made in accordance with present invention was prepared substantially in accordance with the methods described herein and containing the following ingredients in parts by weight:

| Ingredient | PBW |
| --- | --- |
| gypsum hemihydrate | 79 |
| paper fibers | 7 |
| filler (celite) | 2.7 |
| inorganic binder | |
| Type III cement | 10 |
| lime | 0.3 |
| glass fiber | 0.8–2.0 |

The fiberboard was tested for hose stream resistance in accordance with the procedure described in comparative example 1 and found to have a resistance of about 60–65 seconds.

Fiberboard Example 2

A fiberboard composition made in accordance with present invention was prepared containing the following ingredients in parts by weight:

| Ingredient | PBW |
| --- | --- |
| gypsum hemihydrate | 79 |
| paper fibers | 7 |
| filler (perlite) | 12.9 |
| inorganic binder | |
| lime | 0.3 |
| glass fiber | 0.8–2.0 |

The fiberboard was tested for hose stream resistance in accordance with the procedure described in comparative example 1 and found to have a resistance of about 35 seconds.

B. Fire Door Constructions

The compositions of the present invention may be used as fire door components in fire doors as disclosed in U.S. Pat. No. 5,305,577, which is incorporated herein by reference.

The preferred articles of the present invention have a density of from about 50 lbs/ft$^3$ to about 90 lbs/ft$^3$, a flexural strength of at least about 30 lbs (½ inch thick material), and a screw-holding capacity, defined below, of at least about 400 lbs. When incorporated into structures, such as fire door constructions, the gypsum fiberboards of this invention, whether they be in the form of panels, boards, skins, cores, glass panel framing members or other structural members, are designed to provide at least a 20 minute ASTM E152 fire test rating and a hose stream resistance, as defined hereinbefore, of greater than about 20 seconds.

It is contemplated that certain fire-resistant structures provided by this invention will pass at least 45, 60, and 90 minute ASTM E-152 fire tests.

Referring now to FIGS. 2–5, there is shown a solid fire-resistant door structure which includes a 90 minute ASTM E-152 fire test label. This door, shown in both "flush" and "panel" configurations, preferably contains a gypsum fiberboard core having a thickness of about 1.5 inches. The core can contain one or more layers of fiberboard panels of the previously described composition, but preferably includes three ½ inch fiberboard panels adhered together with adhesive.

Figure 2:
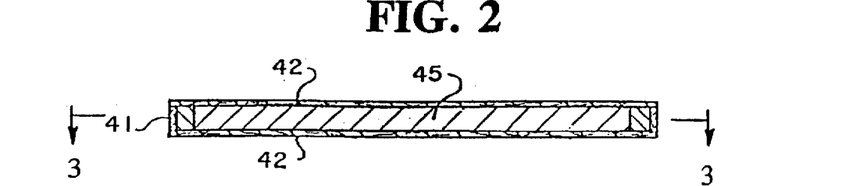
FIG. 2: is a top view of one of the preferred fire doors of this invention.
Figure 3:
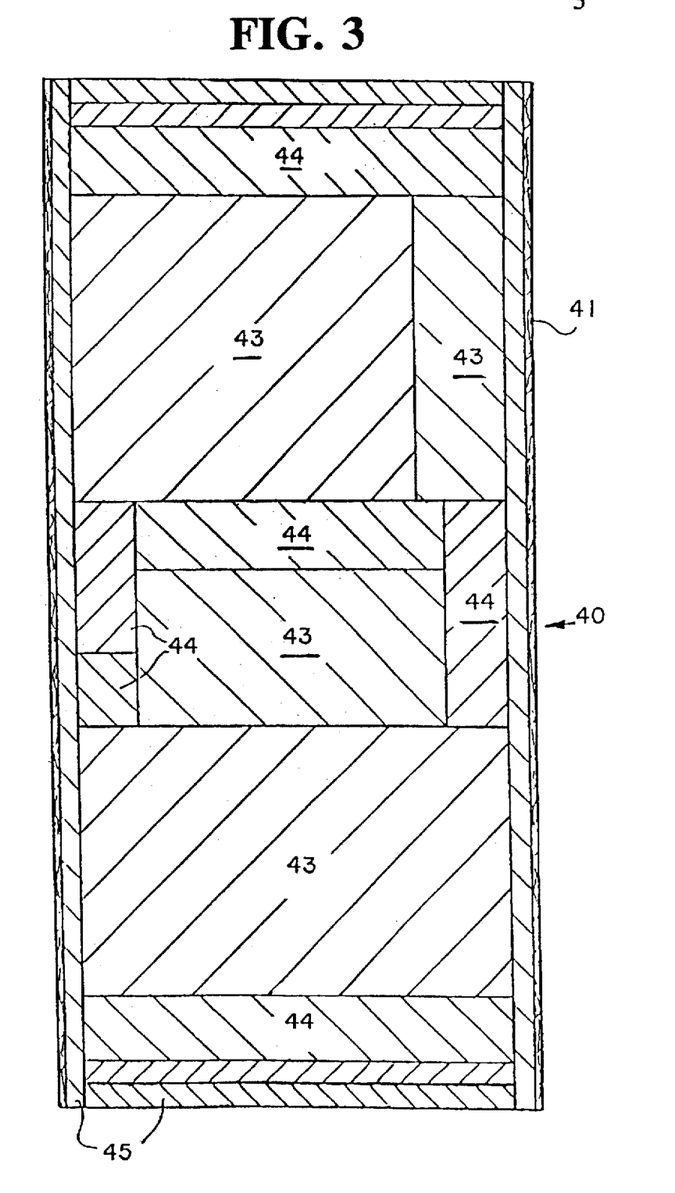
FIG. 3: is a front cross-sectional view taken along line 3—3 of the fire door of FIG. 2.

With reference to FIGS. 2 and 3, there is shown in top and front cross-sectional views, a solid fire door construction 40 employing a solid multi-section, fiberboard core. This fire door 40 is preferably about 4 feet wide and 8 feet high, and includes a gypsum fiberboard core having a density of at least about 60 lbs/ft$^3$ and a composition containing from about 65 wt. % to about 90 wt. % set gypsum dihydrate and about 7 wt. % to about 30 wt. % paper fiber. The fiberboard core of fire door 40, can include multi-ply fiberboard sections 43, which can be adhered along their side edges to provide a complete core with other structural members. The fiberboard compositions can also be employed in both the edge banding 45 used to support the latch mechanism and to provide structural support to the edge of the door, for example the fiberboard vertical stiles and horizontal rails in FIG. 3 (note, that the rails are depicted as two fiberboard members adhered along their longitudinal length), blocking 44 used to provide further support for a latch as well as the door knob and other hardware. The door facings 42 are preferably made of birch or plywood veneer, ⅛ inch thick, and natural fir strips 41 are preferably adhesively bonded to the stiles. Alternatively, this invention contemplates employing a fiberboard core without facings, in which panels may be cut directly into the fiberboard surface without a significant loss in structural properties.

Figure 4:
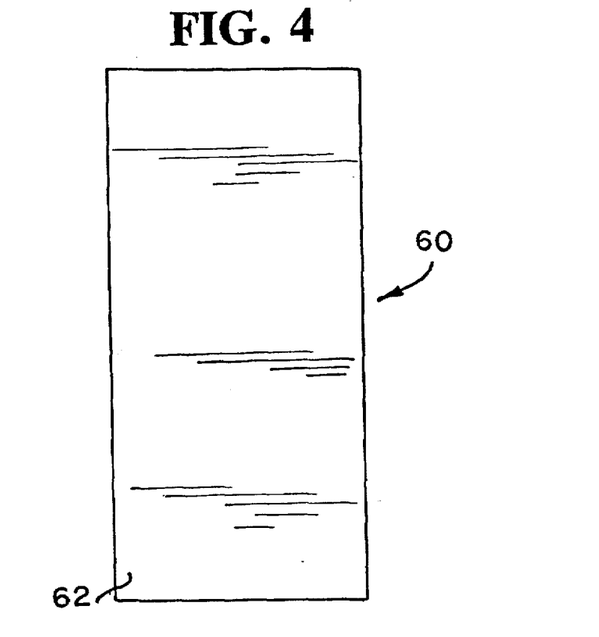
FIG. 4: is a front elevational view of another fire door within the scope of this invention.
Figure 5:
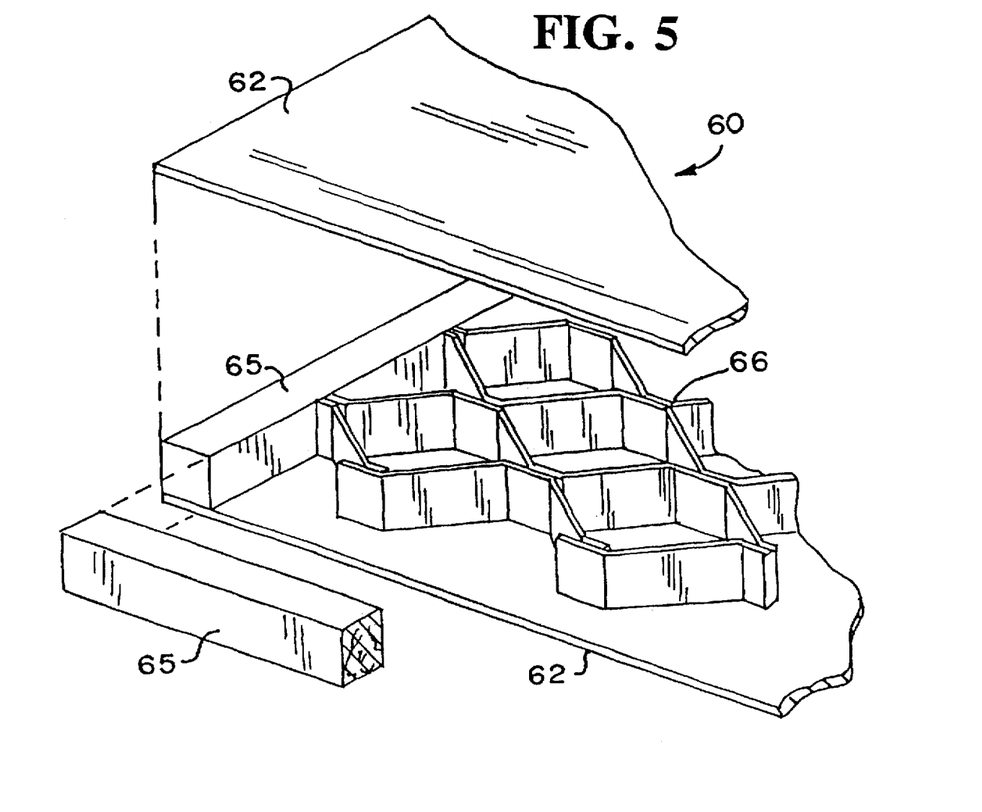
FIG. 5: is an isometric view of a corner of the fire door of FIG. 4 with portions broken away.

As illustrated in FIGS. 4 and 5, a light-weight fire door construction 60 having at least a 20 minute ASTM E-152 fire test rating can also be produced, which includes a honeycomb-like structure 66, for example, cardboard honeycomb or plastic foam spacer sheets such as those described in Lehnert and Fowler, U.S. Pat. No. 4,811,438, Col. 4, which patent is hereby incorporated by reference, for providing a multiplicity of points for supporting a pair of gypsum fiberboard panels 62. The panels 62 preferably comprise a composition having a density of at least about 60 lbs/ft$^3$, a flexural strength of at least about 30 lbs, and preferably at least about 40 lbs (½ inch thick material), and a screw-holding capacity of at least about 400 lbs. The composition of the panels 62 preferably contains a substantially uniform distribution of solids in accordance with the teachings hereof. In this embodiment, a pair of facings, (not illustrated) preferably ⅛ inch thick plywood skins, can be adhered to the gypsum fiberboard panels 62 to provide an aesthetically appealing surface which can be stained or painted to match or blend with interior furnishings or exterior surface treatments.

The honeycomb-like structure 66 of the preferred light-weight door construction 60 is desirably enclosed around its perimeter with gypsum fiberboard edge banding 65. Although the edge banding 65 can include the same composition as the gypsum fiberboard panels 62, it preferably comprises the preferred edge banding composition described herein. The preferred edge banding 65 has a density of at least about 65 lbs/ft$^3$ and a screw-holding capacity of at least about 600 lbs, although densities of up to and exceeding 70 lbs/ft$^3$ and screw-holding capacities in excess of 700 lbs are also suitable for this purpose.

The sheets of wood-like material, also referred to as "veneer" or "facing sheets", if employed, are preferably made of thin wood sheets, thin hardboard or plywood having a thickness of approximately ⅛ inch or less. Other sheets of thin material could also be employed for these members, such as metal, or polymers, especially fiber reinforced plastics.

Generally speaking, panels which do not include plywood or other types of veneer will require additional resin for enabling improved scuff resistance for the exposed surface. Additionally, the resin component can be added to the composition for edge banding applications for improving mechanical properties.

It will be understood, upon inspection of the disclosed fiberboard embodiments, that clay additions will vary depending upon the thickness of the fiberboard used. Clay is also important for obtaining "stand alone" qualities, i.e., the ability of the fiberboard to stand upright after fire has consumed the honeycomb core. These features are important for thicknesses of fiberboards less than about ½ inches. (For example, thinner panels, such as those employed for ⅛ inch skins, 3/16 inch, and ⅛ inch panels require more clay for resistance to structural cracking, which is partially caused by thermal and pressure changes during fire testing.) While it is known that clay reduces shrinkage, see Green, U.S. Pat. No. 3,616,176, which is hereby incorporated by reference, it also seems to provide a more rigid panel that resists flexing during handling. This resistance to flexing becomes critical during a fire test of fire doors, as the paper honeycomb burns away, requiring the panels to stand alone over about a 36 inch span, the width of a standard size door. For thin panels, for example, less than about ⅛ inches, the fiberboard composition should contain about 5–15 wt. % clay, and preferably about 9–11 wt. % clay.

C. Glass Partition Walls

Applicants have surprisingly discovered that fire resistant structures comprising glass panels and gypsum-based framing members supporting the glass panels are capable of exhibiting extraordinary fire resistant properties. Accordingly, the present invention is also directed to the use of the present compositions in any structure which incorporate glass panels, including doors with window lights, window frames and the like.

A specifically preferred embodiment of the present invention, however, is directed to glass partition walls, and even more particularly interior glass partition walls. An exemplary partition wall in accordance with this aspect of the present invention is illustrated in a semi-schematic, elevation view in FIG. 6 hereof.

Figure 6:
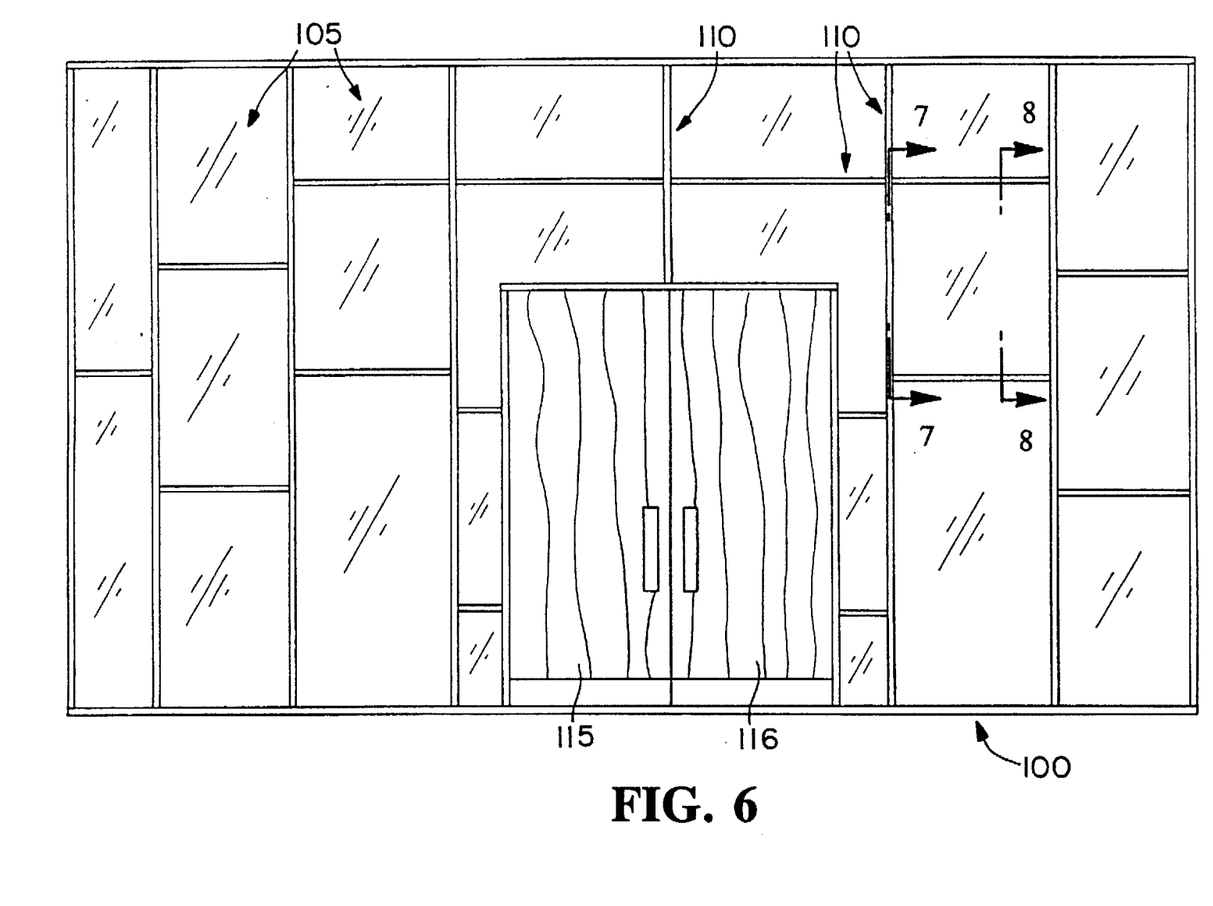
FIG. 6: is an elevation of a glass partition wall in accordance with on embodiment of this invention.

With particular reference now to FIG. 6, a glass partition wall is indicated generally as 100. The wall 100 is comprised of a plurality of glass panels 105 supported by framing members 110. The partition wall 100 also includes a doorway containing doors 115 and 116.

The glass panels 105 are supported by a plurality of framing members 110, at least a portion of which and preferably substantially all of which, are formed from the gypsum-based fiberboard compositions described above.

Furthermore, it is generally preferred that the gypsum-based fiberboard members have decorative materials applied to the exposed surfaces thereof to enhance the aesthetic of the partition wall in which they are used. For example, it is contemplated that paints, lacquers and the like may be readily applied to the gypsum fiberboard members of the present invention to enhance the appearance thereof. Alternatively and preferably, a thin, wood-like veneer is fastened, and preferably adhesively fastened, to the exposed surfaces of the framing member. Applicants have found that such veneer materials are easily and strongly adhered to the gypsum-based framing members of the present invention and greatly enhance the aesthetic quality of partition walls formed therefrom.

Applicants have also found that the incorporation of such wood or wood-like veneers does not substantially detract from the fire-resistant properties of the present structures. More particularly, applicants have found that the use of gypsum-based fiberboard members in accordance with the present invention substantially reduces the tendency of such veneer materials to detrimentally flame during fire tests. Instead, applicants have observed that such materials tend to char in a fashion that is not detrimental to the structural integrity of the partition wall. Although applicants do not intend to necessarily be bound by or limited to any particular theory of operation, it is believed that the relatively high heat capacity of the water of hydration bound in the set gypsum of the present framing members tends to protect such veneers from rapid and detrimental flaming. Accordingly, applicants have found that highly resistant structural members having many of the desirable features, qualities, and aesthetic of wood can be formed from gypsum-based fiberboard compositions in accordance with the present invention.

Figure 7:
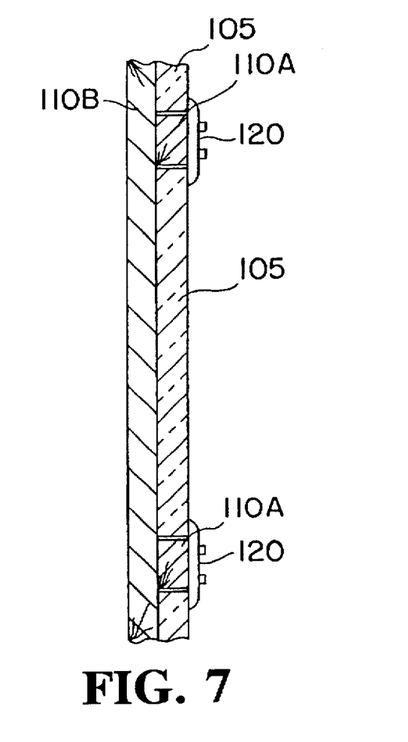
FIG. 7: is a cross sectional view taken along line 7—7 of FIG. 6.
Figure 8:
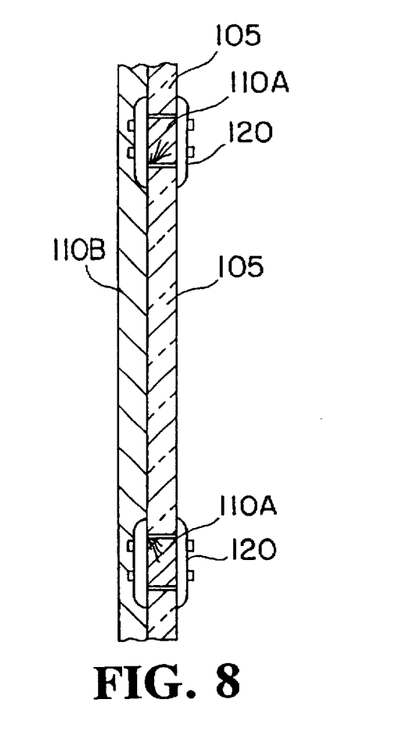
FIG. 8: is a cross sectional view taken along line 8—8 of FIG. 7.

Although it is contemplated that any conventional and well-known means for constructing glass partition walls from wood may be utilized to form such structures from the gypsum-based fiberboard members of the present invention, one type of illustrative construction is shown in cross-section in FIGS. 7 and 8. More particularly, a horizontal gypsum-based fiberboard framing member 110A is attached to a gypsum-based vertical framing member 110B. Framing members 110A and 110B can be attached by any conventional means employed for wood framing members, including adhesive bonding, nailing, screwing and the like. These gypsum-based fiberboard framing members together support glass panels 105, which are preferably held in place by lengths of decorative molding 120. The decorative molding 120 can be formed from any one of several well-known and conventional materials used for such functions, including wood and the like. Because the gypsum-based fiberboard framing members 110 possess exceptional screw and nail holding capacity, a preferred means for mounting molding strips 120 to such members include nailing and screwing. Of course, molding strips 120 may, if desired, also be formed of a gypsum-based fiberboard composition of the present invention, which in turn can then be screwed, nailed, or otherwise fastened to gypsum-based fiberboard framing members 110A.

Figure 9:
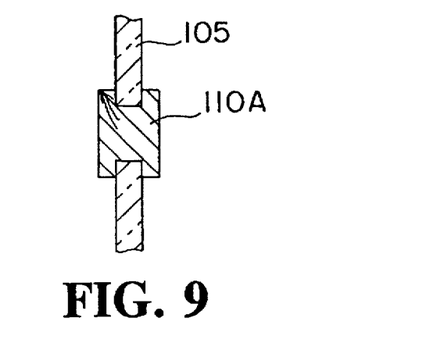
FIG. 9: is a cross sectional view of an alternative construction for a horizontal framing member in accordance with one aspect of the present invention.

It will be appreciated by those skilled in the art in view of the present disclosure that numerous and varied alternative constructions are available for use within the scope of the present invention. For example, FIG. 9 illustrates an alternative to the construction technique illustrated in FIG. 8. More particularly, a horizontal gypsum-based fiberboard member 110A having an I-beam type configuration is utilized. It is contemplated that such a member can be produced in any one of several ways. For example, because of its excellent machinability, it is possible to machine channels in a stud-like member using conventional techniques. Alternatively, it is contemplated that such gypsum-based fiberboard members may be produced with the appropriate configuration by use of an appropriate mold.

Figure 10:
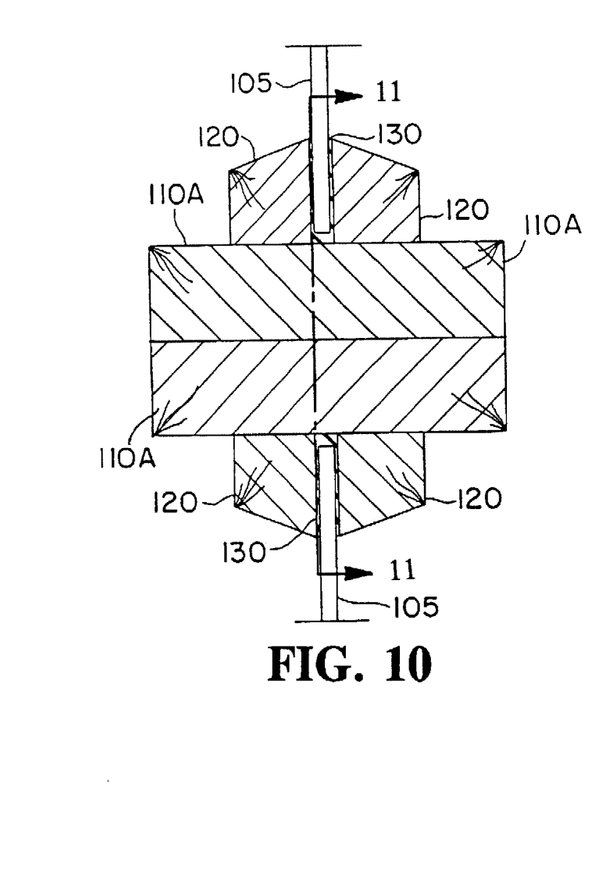
FIG. 10: is a cross sectional view of an alternative construction for a horizontal framing member and bead in accordance with the present invention.
Figure 11:
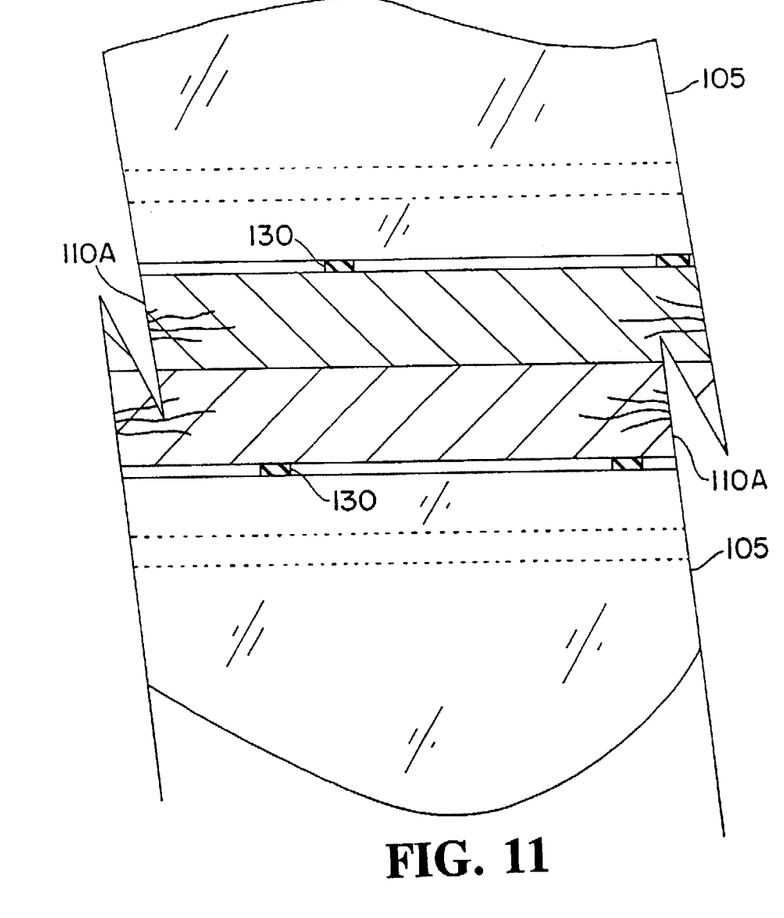
FIG. 11: is a cross sectional view taken along lines 11—11 of FIG. 10.

Another alternative and preferred embodiment of the present invention is illustrated in FIGS. 10 and 11 hereof. More particularly, FIGS. 10 and 11 illustrate the construction of a glass panel wall which eliminates the need for intumescent gaskets and like material between the gypsum-based framing members and the glass panels of the present invention. More particularly, FIG. 10 illustrates a pair of glass panels 105 supported by horizontal, gypsum-based framing members 110A. Bead members 120, also formed of the gypsum-based composition of the present invention, are utilized to further support glass panels 105. Applicants have surprisingly and unexpectedly found that the use of gypsum-based compositions as framing members in accordance with the present invention permits the use of nonintumescent gasket material 130 to fill the voids between the gypsum-based members 110A/120 and glass panels 105. Although such a highly cost-effective construction technique is not feasible for use with either wood or steel framing members, it is contemplated that glass-containing structures in accordance with this embodiment of the present invention are capable of achieving a 20-minute ASTM E-152 fire test rating, and even more preferably a 90-minute ASTM E-152 fire test rating.

From the foregoing, it can be realized that this invention provides fire-resistant panels and doors which can be used in combination with known fire door, beam or column elements to provide various constructions, as needed, for different fire ratings at minimal cost. The fiberboard panels of this invention are stable through a wide range of humidities, require less adhesive, require no additional edge system, are machinable into contoured configurations, and cost less to manufacture than gypsum wallboard. The outlined combination of physical properties and materials, when applied to fire door manufacturing, opens up new frontiers of opportunities in door costs and construction designs. Although various embodiments have been illustrated, this was for the purpose of describing and not limiting the invention. Various modifications, which will become apparent to one skilled in the art, are within the scope of this invention described in the attached claims.

We claim:

1. A fire resistant article characterized by a composition comprising:

at least about 65 wt. % set gypsum dihydrate;

at least about 3 wt. % of reinforcing fibers disposed substantially homogeneously throughout said set gypsum dihydrate;

from about 0 to about 5 wt. % of refractive filler; and from about 0.1 wt. % to about 20 wt. % refractory inorganic binder wherein said article has a hose stream resistance of greater than about 20 seconds.

2. The article of claim 1 having at least a 20 minute ASTM E-152 fire test rating and a screw-holding capacity of at least about 400 lbs (1 inch thick material).

3. The article of claim 1, characterized by the composition having a density of at least about 60 lbs./ft$^3$.

4. The article of claim 1 having a density of at least about 65 lbs/ft$^3$ and a screw-holding capacity of at least about 600 lbs (1 inch thick material).

5. A fire-resistant structure comprising the article of claim 1.

6. A fire-resistant door comprising as the core thereof the article of claim 1, said structure having at least a 20 minute ASTM E-152 fire test rating.

7. The article of claim 1 comprising from about 65 wt. % to about 90 wt. % gypsum dihydrate.

8. The article of claim 7 comprising from about 75 wt. % to about 85 wt. % of gypsum dihydrate.

9. The article of claim 1 wherein said refractory inorganic binder comprises a Portland cement.

10. The article of claim 9 comprising from about 2 wt. % to about 5 wt. % of refractive filler.

11. The article of claim 10 wherein said refractive filler comprises diatomaceous earth.

12. The article of claim 11 wherein the composition comprises from about 5 wt. % to about 15 wt. % of Portland cement, from about 0.1 wt. % to about 1 wt. % of free lime, and from about 2 wt. % to about 5 wt. % of refractive filler.

13. The article of claim 1 comprising from about 0.1 wt. % to about 1 wt. % refractory inorganic binder and from about 5 wt. % to about 15 wt. % refractive filler.

14. The article of claim 12 wherein said inorganic binder comprises free lime.

15. A fiberboard composition comprising: at least about 65 wt. % gypsum dihydrate; reinforcing fibers disposed substantially homogeneously throughout said set gypsum dihydrate; refractory inorganic binder; and optionally refractive filler, said composition having hose stream resistance of greater than about 20 seconds.

16. The article of claim 1 wherein said refractory binder comprises Class C flyash and wherein said article has a hose stream resistance of no less than 30 seconds.

17. The composition of claim 15 wherein said composition comprises from about 5 wt % to about 20 wt % refractory inorganic binder and wherein said optional refractive filler is present in the composition and comprises diamataceous earth.

18. The composition of claim 17 wherein said composition comprises less than about 5 wt % of said refractive filler.

19. The composition of claim 15 having a hose stream resistance of no less than 30 seconds.

20. A fiberboard composition comprising; at least about 65 wt % gypsum dihydrate; reinforcing fibers distributed substantially homogeneously throughout said gypsum dihydrate, from about 0.1 wt % to about 1 wt % of free lime; and at least about 5 wt % of refractive filler, wherein said composition has a hose stream resistance of at least about 20 seconds.

21. The composition of claim 20 having a hose stream resistance of no less than 30 seconds.

* * * * *